(12) United States Patent
Gold

(10) Patent No.: US 10,132,185 B2
(45) Date of Patent: Nov. 20, 2018

(54) ADDITIVE PROCESS FOR AN ABRADABLE BLADE TRACK USED IN A GAS TURBINE ENGINE

(71) Applicant: Rolls-Royce Corporation, Indianapolis, IN (US)

(72) Inventor: Matthew R. Gold, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 359 days.

(21) Appl. No.: 14/861,200

(22) Filed: Sep. 22, 2015

(65) Prior Publication Data
US 2016/0130969 A1   May 12, 2016

Related U.S. Application Data

(60) Provisional application No. 62/076,834, filed on Nov. 7, 2014.

(51) Int. Cl.
| | |
|---|---|
| *F01D 11/12* | (2006.01) |
| *F01D 11/00* | (2006.01) |
| *F01D 25/24* | (2006.01) |
| *B22F 5/00* | (2006.01) |

(Continued)

(52) U.S. Cl.
CPC .......... *F01D 11/122* (2013.01); *B22F 3/1055* (2013.01); *B22F 5/009* (2013.01); *F01D 5/02* (2013.01); *F01D 11/001* (2013.01); *F01D 25/24* (2013.01); *F05D 2220/32* (2013.01); *F05D 2230/22* (2013.01); *F05D 2230/30* (2013.01); *F05D 2230/90* (2013.01); *F05D 2240/11* (2013.01); *F05D 2240/24* (2013.01); *F05D 2240/55* (2013.01); *F05D 2300/514* (2013.01); *F05D 2300/608* (2013.01); *F05D 2300/609* (2013.01); *F05D 2300/61* (2013.01)

(58) Field of Classification Search
CPC ...... F01D 11/001; F01D 11/08; F01D 11/122; F01D 11/125; F01D 11/127; F01D 9/04; F01D 25/24; F05D 2300/608; F05D 2300/514; F05D 2240/11
See application file for complete search history.

(56) References Cited

U.S. PATENT DOCUMENTS

| | | | |
|---|---|---|---|
| 4,422,648 A * | 12/1983 | Eaton | F01D 11/12  277/415 |
| 4,430,360 A | 2/1984 | Bill et al. | |
| 4,884,820 A | 12/1989 | Jackson et al. | |

(Continued)

FOREIGN PATENT DOCUMENTS

| | | |
|---|---|---|
| EP | 2319641 A1 | 5/2011 |
| WO | 02/18674 A2 | 3/2002 |

OTHER PUBLICATIONS

Extended European Search Report for European Application No. 15188879.9-1610, dated Apr. 4, 2016, 8 pages.

*Primary Examiner* — Justin Seabe
*Assistant Examiner* — Brian P Wolcott
(74) *Attorney, Agent, or Firm* — Shumaker & Sieffert, P.A.

(57) ABSTRACT

A gas turbine engine assembly comprising a rotor, a gas path component, and a carrier. The rotor includes a shaft adapted to rotate about an axis and a gas-path component that extends from the shaft for rotation therewith about the axis. The carrier extends around the gas-path component to block gasses from passing over the gas-path component during rotation of the rotor.

14 Claims, 4 Drawing Sheets

(51) Int. Cl.
    *B22F 3/105*     (2006.01)
    *F01D 5/02*     (2006.01)

(56) References Cited

U.S. PATENT DOCUMENTS

| | | |
|---|---|---|
| 6,365,236 B1 * | 4/2002 | Maloney .............. C23C 14/083 |
| | | 427/250 |
| 6,457,939 B2 | 10/2002 | Grasripoor et al. |
| 6,887,528 B2 | 5/2005 | Lau et al. |
| 6,916,529 B2 | 7/2005 | Pabla et al. |
| 7,029,232 B2 | 4/2006 | Tuffs et al. |
| 7,223,067 B2 | 5/2007 | Wilson et al. |
| 7,360,991 B2 | 4/2008 | Ford et al. |
| 7,425,115 B2 | 9/2008 | Johnson et al. |
| 7,479,328 B2 | 1/2009 | Roth-Fagaraseanu et al. |
| 7,618,712 B2 | 11/2009 | Sabol et al. |
| 7,753,643 B2 | 7/2010 | Gonzalez et al. |
| 7,819,625 B2 | 10/2010 | Merrill et al. |
| 7,846,561 B2 * | 12/2010 | Kulkarni .................. C23C 4/02 |
| | | 428/323 |
| 7,935,413 B2 * | 5/2011 | Stamm .................. C23C 28/022 |
| | | 428/212 |
| 8,007,899 B2 | 8/2011 | Freling et al. |
| 8,061,978 B2 | 11/2011 | Tholen et al. |
| 8,100,640 B2 | 1/2012 | Strock et al. |
| 8,124,252 B2 | 2/2012 | Cybulsky et al. |
| 8,162,602 B2 | 4/2012 | Caucheteux et al. |
| 2004/0021256 A1 | 2/2004 | DeGrange et al. |
| 2010/0171241 A1 | 7/2010 | Huskamp et al. |
| 2012/0213659 A1 | 8/2012 | Bayer et al. |
| 2013/0045091 A1 | 2/2013 | Della-Fera et al. |

* cited by examiner

ADDITIVE PROCESS FOR AN ABRADABLE BLADE TRACK USED IN A GAS TURBINE ENGINE

CROSS REFERENCE TO RELATED APPLICATIONS

This application claims priority to and the benefit of U.S. Provisional Patent Application No. 62/076,834, filed 7 Nov. 2014, the disclosure of which is now expressly incorporated herein by reference.

FIELD OF THE DISCLOSURE

The present disclosure relates generally to gas turbine engines, and more specifically to abradable coatings of gas turbine engine components.

BACKGROUND

Rotating gas turbine engine components such as compressor blades, turbine blades, and knife seal rings spin at high speeds. Many of these rotating components are mounted in close proximity to static components such that the components may come into contact during rotation. Abradable coatings may be used at the interface of these rotating and static components within gas turbine engines to improve engine life and efficiency.

The coatings may be used to reduce wear to rotating and static components when they make contact with one another while allowing for close tolerance to be maintained between the rotating and static components. Abradable coatings sometimes consist of materials and microstructures that contain a matrix material and a fugitive phase applied using a thermal spray process. The abradable materials used for coating a component in a gas turbine engine may vary based on the location and the material of the component.

SUMMARY

The present disclosure may comprise one or more of the following features and combinations thereof.

According to an aspect of the present disclosure, a gas turbine assembly comprising a rotor, a gas path-component, a carrier, and a runner for use in a gas turbine engine is taught. The assembly may comprise a rotor including a shaft adapted to rotate about an axis, a gas-path component that may extend from the shaft for rotation therewith about the axis, a carrier that may extend around the gas-path component to block gasses from passing over the gas-path component during rotation of the rotor, and an abradable runner that may extend from the carrier toward the gas-path component to reduce a gap between the carrier and the gas-path component.

In some embodiments, the abradable runner may include a first zone having a first microstructure and a second zone having a second microstructure different from the first microstructure. The first zone may be arranged in a predetermined location relative to the second zone such that the first zone may be positioned circumferentially adjacent to the second zone.

In some embodiments, the gas path component may be selected from the group consisting of a turbine blade, a compressor blade, and a knife. In some embodiments, the elemental composition of the first zone may be substantially the same as an elemental composition of the second zone. The first microstructure may comprise about 1% to about 50% porosity, and the second microstructure may comprise about 1% to about 50% porosity.

In some embodiments, the first zone may be substantially sintered to the second zone to form a first layer of the abradable runner. In some embodiments, the first layer of the abradable runner may be substantially sintered to a second layer of the abradable runner wherein the second layer may include a third zone substantially sintered to a fourth zone. In some embodiments, the first zone may extend in an axial direction along the central axis and may be located circumferentially adjacent to the second zone. The first zone may extend circumferentially around at least a portion of the central axis and may be located axially adjacent to the second zone.

According to another aspect of the present disclosure, a gas turbine assembly comprising an annular carrier and an abradable component is taught. The abradable component may extend from the annular carrier.

In some embodiments, the abradable component may include a first zone and a second zone. The first zone may have a first microstructure substantially different from a second microstructure of the second zone.

In some embodiments, an elemental composition of the first zone may be substantially the same as an elemental composition of the second zone. The first microstructure may comprise about 1% to about 50% porosity, and the second microstructure may comprise about 1% to about 50% porosity. The first zone may comprise a first grain size, and the second zone may comprise a second grain size smaller than the first grain size. The first microstructure may comprise substantially solid particles within a matrix, and the second microstructure may comprise hollow particles within a matrix.

In some embodiments, the first microstructure may be substantially sintered, and the second microstructure may be at least partially unsintered. The first zone and the second zone may comprise a first phase and a second phase, wherein the first phase may have a sintering temperature lower than a sintering temperature of the second phase, further wherein the first phase and the second phase of the first zone may be at least partially sintered, the first phase of the second zone may be at least partially sintered, and the second phase of the second zone may be substantially unsintered.

In some embodiments, the first zone and the second zone may form a first layer of the abradable component and the abradable component may include a third zone and fourth zone that may form a second layer arranged radially adjacent to the first layer. The first zone may extend in an axial direction along the central axis and may be located circumferentially adjacent to the second zone. The first zone may extend circumferentially around at least a portion of the central axis and may be located axially adjacent to the second zone.

In another aspect of the present invention a method for forming an abradable runner is taught. The method comprising depositing a powder feedstock onto a gas turbine engine carrier, heating a first zone of the powder feedstock to create a first microstructure using directed energy, and heating a second zone of the powder feedstock to create a second microstructure using directed energy wherein the first zone may be arranged in a predetermined location relative to the second zone to form the abradable runner.

In some embodiments, heating the first zone may comprise heating to a first temperature, and the heating the second zone may comprise heating to a second temperature lower than the first temperature such that the first phase and the second phase of the first zone may be at least partially sintered. The first phase of the second zone may be at least partially sintered, and the second phase of the second zone may be substantially unsintered.

In some embodiments, the first zone may be formed to extend in an axial direction along the central axis and may be located circumferentially adjacent to the second zone. In some embodiments, the first zone may be formed to extend circumferentially around at least a portion of the central axis and may be located axially adjacent to the second zone.

These and other features of the present disclosure will become more apparent from the following description of the illustrative embodiments.

DETAILED DESCRIPTION OF THE DRAWINGS

Figure 1:
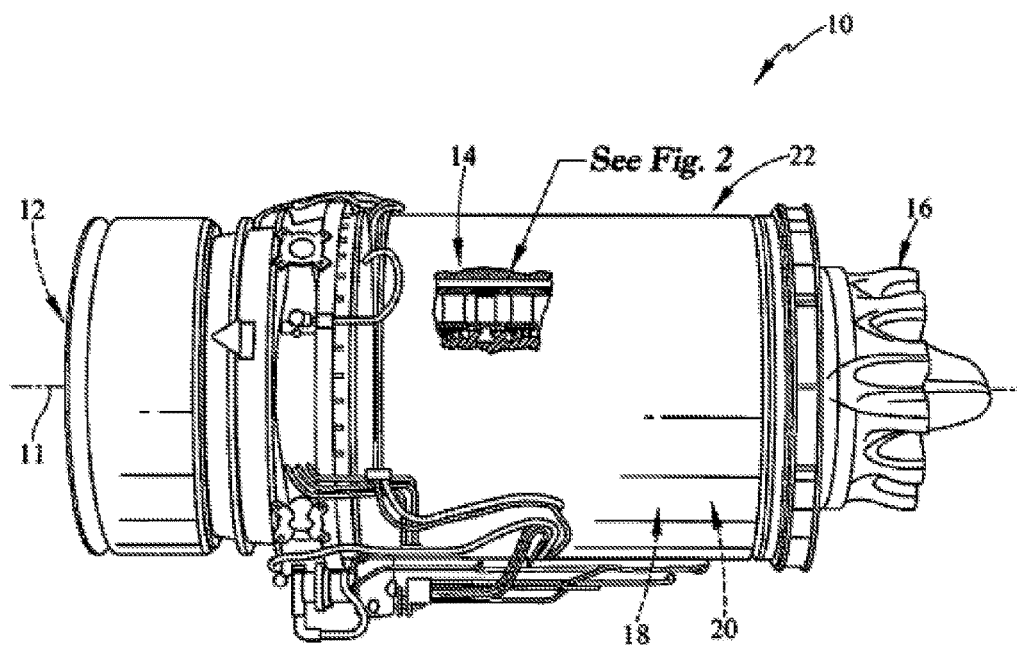
FIG. 1 is a side elevation of a gas turbine engine cut away to show a portion of a compressor and turbine section included in a gas turbine engine.

For the purposes of promoting an understanding of the principles of the disclosure, reference will now be made to a number of illustrative embodiments illustrated in the drawings and specific language will be used to describe the same.

An illustrative aerospace gas turbine engine 10 may include a fan 12, a compressor 14, and an exhaust 16 as shown in FIG. 1. The fan 12 may push air past the rest of the engine 10, creating some thrust, and into the compressor 14 where the air may be compressed and delivered to the combustor 18. The combustor 18 may mix fuel with the compressed air received from the compressor 14 and may ignite the fuel sending hot, high-pressured products to the turbine 20. The turbine 20 may convert energy from the hot, high-pressured products into rotational energy that drives the fan 12 and the compressor 14. The hot, high-pressured products then exit the gas turbine engine through the exhaust 16 creating additional thrust.

Figure 2:
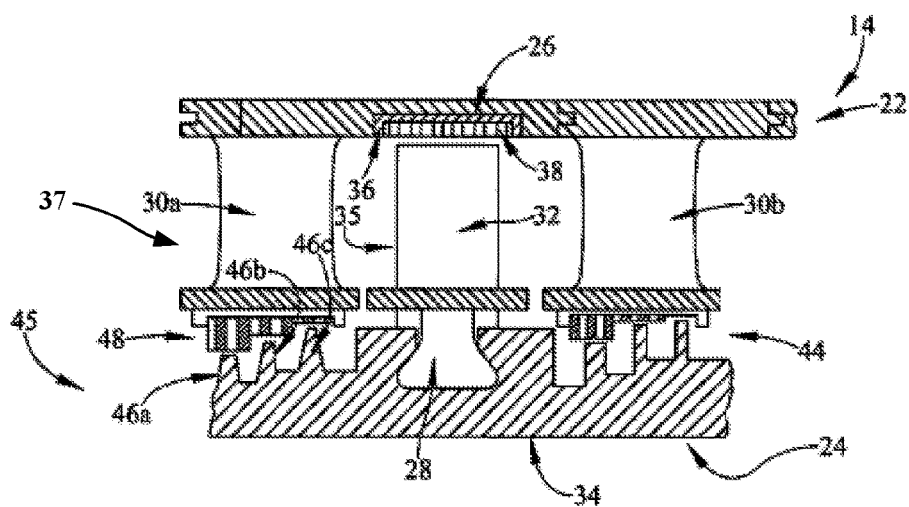
FIG. 2 is a detail view the portion of the compressor exposed in FIG. 1 showing abradable shrouds adjacent to rotating components of the compressor.

The compressor 14 may include a case 22, a rotor 24, and a shroud 26 as shown in FIG. 2. The case 22 may enclose the rotor 24 and vanes 30a, 30b within the compressor 14. The rotor 24 may be mounted in the case 22 for rotation about an engine axis 11 relative to the case 22 and may include a shaft 34 or disc and a plurality of blades 35. The blades 35 may each include a root 28 engaged with the shaft 34 and an airfoil 32 that extends into a gas path 37 of the compressor 14. The vanes 30a, 30b may direct air to pass over the airfoils 32 as the air moves through the compressor 14. The shroud 26 may be mounted in or integrated into the case 22 and may extend around the airfoils 32 of the rotor 24 to block air from passing over the airfoils 32 without interacting with the airfoils 32 during rotation of the rotor 24.

Figure 3:
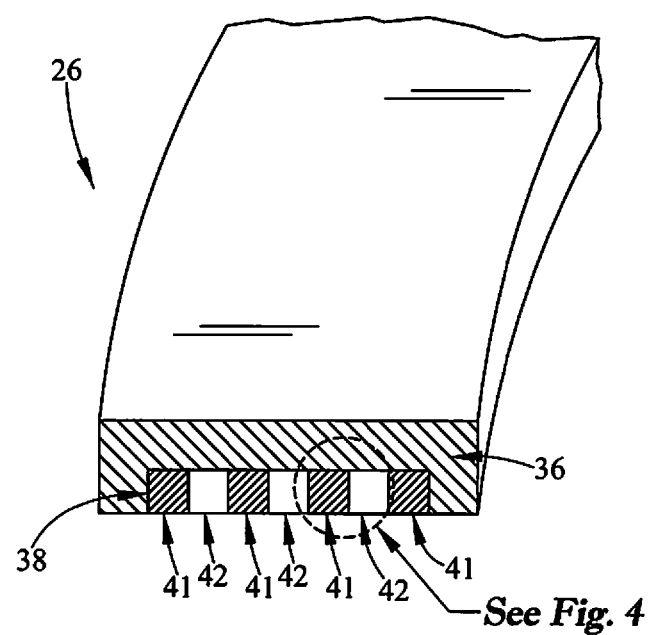
FIG. 3 is a perspective view of an abradable runner coupled to a carrier to provide a shroud adapted to extend around a rotating engine component.

The shroud 26 may include a carrier 36 and an abradable runner 38 as shown in FIGS. 2 and 3. The carrier 36 may support the abradable runner 38. The abradable runner 38 is illustratively a coating that may be fabricated from an abradable material to reduce wear on engine components and/or reduced unwanted airflow as suggested in FIG. 2.ABradable components such as the abradable runner 38 formed according to the methods described herein may allow for particular control over the runner 38 microstructure. The abradable runner 38 may include materials of different porosities, fugitive phases, phase size, etc. allowing for varying patterns and microstructures within the runner 38.

Figure 4:
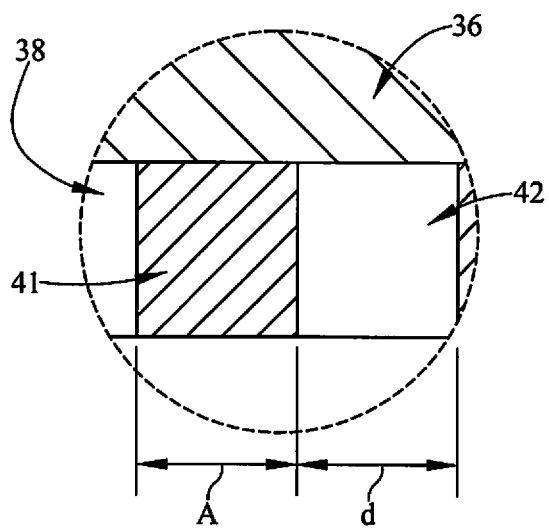
FIG. 4 is a detail view of the abradable runner showing that the abradable runner includes a first zone and a second zone having different characteristics.

The abradable runner 38 may include a plurality of zones as depicted in FIGS. 3 and 4. In the illustrative example of FIGS. 3 and 4, the abradable runner 38 includes a first zone 41 and an axially-adjacent second zone 42. The first and second zones 41, 42 may have different characteristics as further described herein.

The first zone 41 and second zone 42 may include microstructures of varying porosity, grain size, and may be of differing fugitive phases as depicted in FIGS. 3 and 4. For example, the first microstructure may comprise about 1% to about 50% porosity by volume, and the second microstructure may comprise about 1% to about 50% porosity by volume. The first zone 41 may have a first microstructure different from a second microstructure of the second zone 42. The first zone 41 may comprise a first grain size and the second zone 42 may comprise a second grain size smaller than the first grain size. In another embodiment, the first zone 41 may comprise substantially solid particles within a matrix and the second zone 42 may comprise substantially hollow particles.

The first zone 41 may extend in a circumferential direction around the central axis 11 and may be located axially adjacent to the second zone 42 as depicted in FIGS. 3 and 4. In another embodiment, the first zone 41 may extend axially along at least a portion of the central axis and may be located circumferentially adjacent to the second zone 42. The microstructure of the first zone 41 and the second zone 42 may vary as a function of depth providing for a denser structure at the axial ends and/or radially outward top of the runner 38 adjacent to the carrier 36 and a more abradable structure at the bottom and/or center of the runner 38. The function of having the denser structure at the top and/or ends of the more abradable structure may be to allow for abrasion during the run in cycle of an engine and more erosion resistant coating after the engine run in is complete.

An abradable three dimensional component such as the abradable runner of FIGS. 3 and 4 may be formed by sintering any number of zones in a plurality of predetermined successively building layers to form a larger component. The first zone 41 may be substantially sintered to the second zone 42 to form a first layer of an abradable component such as the abradable runner 38 formed within the carrier 36 in FIGS. 3 and 4. The zones may vary in depth and width such as the width of the first zone 41 having a width A and the second zone 42 having a width d as depicted in FIG. 4. For example, width A may be between about 1 mm and about 5 mm and width d may be between about 1 mm and about 5 mm.

The compressor 14 may also include a number of knife seals 44, 45 each formed from a plurality of knife rings 46a, 46b, 46c, and an abradable runner 48 as described herein and shown in FIG. 2. During normal operation of the gas turbine engine 10, the knife rings 46a, 46b, 46c may come in contact with the abradable runner 48. The contact between the knife ring and the abradable runner 48 effectively seals airflow from the gas turbine engine 10. Like the abradable runner 38 the abradable runner 48 may include a plurality of zones 51, 52 having different characteristics as described herein.

Figure 5:
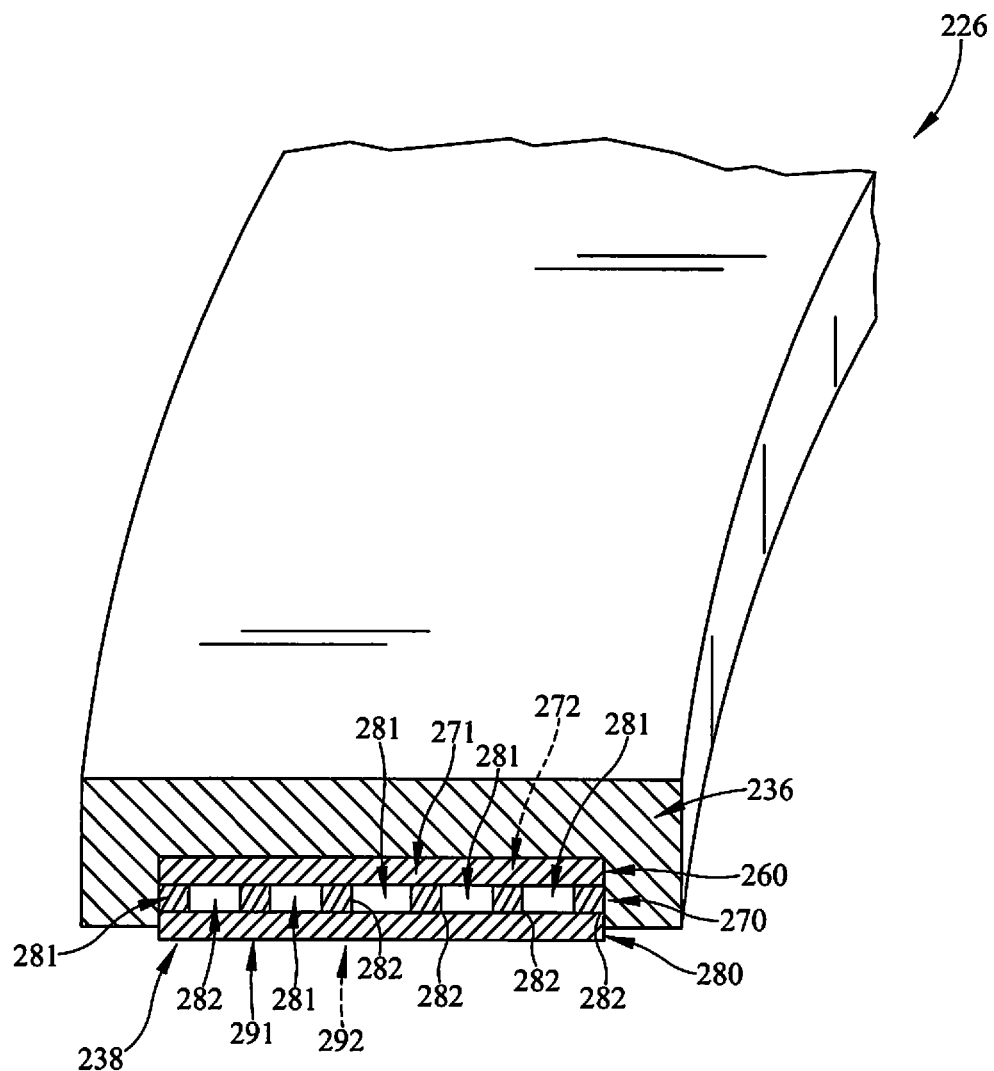
FIG. 5 is a perspective view of another abradable runner for use in a gas turbine engine showing that the abradable runner includes multiple layers each having multiple zones.

Another abradable runner 238 adapted for use with the carrier 36 in compressor 14 is shown, for example, in FIG. 5. The abradable runner 238 is shown carried by carrier 236, and carrier 236 and abradable runner 238 together form a shroud 226. The abradable runner 28 may include a plurality of layers 260, 270, 280. The first layer 260 may be one zone whereas the second layer 270 may consists of multiple zones 281, 282 and the third layer 280 may be one zone 291 again, showing that any number of patterns may be achieved with different characteristics as described herein.

In the particular example shown in FIG. 5, the layers 260, 270, 280 may be stacked radially on one another. Zones 271, 271 of the first layer 260 and zones 291, 292 of the third layer 280 may extend axially while zones 281, 282 of the second layer 270 may extend circumferentially. Accordingly, a three dimensional pattern of material characteristics may be created within the abradable runner 238.

Figure 6:
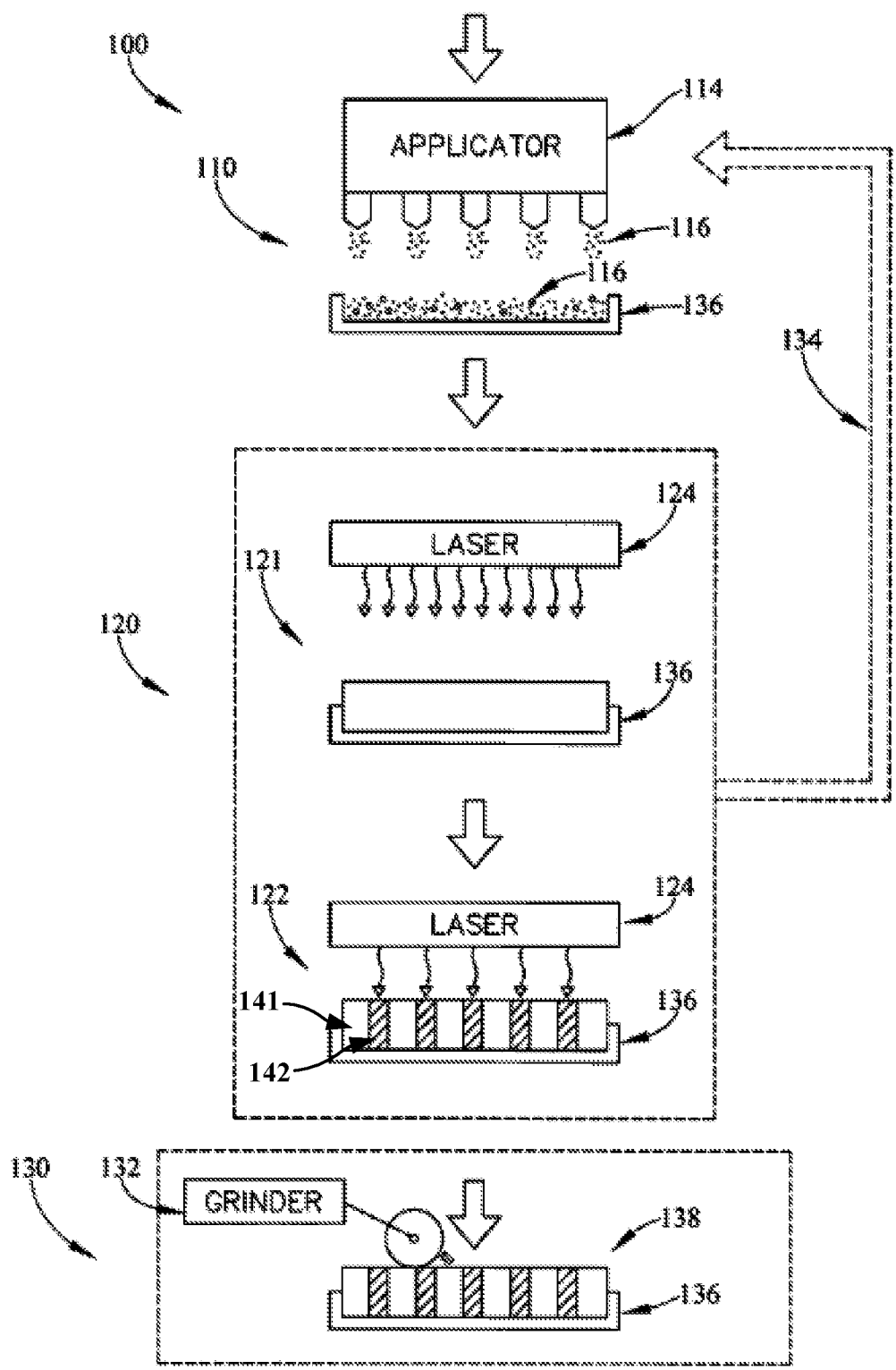
FIG. 6 is a diagrammatic illustration of the method of forming an abradable component such as an abradable runner for a gas turbine engine.

One illustrative method 100, for forming an abradable component such as the abradable runners 38, 48, 138, 238 of FIGS. 3-5 is shown in FIG. 6. The illustrative method 100 may include the steps of depositing powder 110, heating the powder 120, and grinding the runners 38, 48, 138, 238. In a step 110 of the method 100, an applicator 114 deposits a powder feedstock 116 onto a carrier 136. The powder feedstock may be deposited using any number of methods including powder bed or powder injection at point of heating. The feedstock for producing abradable components, like the runner 38, may vary based on the location of the component. For example, in low temperature applications, such as the compressor 14, the feedstock may include aluminum and/or aluminum silicon alloy blended with polymer, aluminum alloys blended with a solid lubricant, or other suitable materials. In another example, in high temperature applications, such as in the turbine 20 the feedstock may include nickel based alloys blended with polymer and/or solid lubricants, cobalt based alloys blended with polymer and/or a solid lubricants, or other suitable materials. The powder feedstock may contain a metal or a blend of a metal and a secondary fugitive phase. The percentage of the fugitive phase in a blend may be between about 0 weight % and about 50 weight %.

The step 120, of the method 100, may include applying directed energy beams, illustratively via a laser, or an energy beam 124 to the powder feedstock 116 to create the abradable runners 38, 48, 138, 238 of FIGS. 3-5 as shown in FIG. 6. In the illustrative embodiment, the step 120 may include a sub-step 121 in which energy is applied by the directed energy 124 across all of the powder feedstock 116 to heat all of the powder feedstock 116. The step 120 may also include a sub-step 122 in which energy is applied to a portion of the powder feedstock 116 to further heat that portion of the powder feedstock 116 and create differing levels of sintering and/or porosity within the completed abradable component. Varying the power of the directed energy 124 and/or the raster pattern of the directed energy 124 may produce differing levels of sintering and/or heat treating may be achieved. The powder feedstock 116 may be heated using the directed energy 124 any number of times to create a predetermined pattern.

In step 120 of the method 100, the first zone 141 may be heated to a different temperature from the second zone 142 to create the predetermined pattern. For example, the first zone 141 may comprise a first phase and the second zone 142 may comprise a second phase, wherein the first phase has a sintering temperature lower than the sintering temperature of the second phase. Optionally as shown by the arrow 134 in FIG. 6, additional layers of powder may be added in step 110 to create additional layers of the abradable runners 38, 48, 138, 238. In an optional step 130 of the method 100, a grinder 132 may be used to smooth the exterior surface of the abradable runners 38, 48, 138, 238.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising
   a rotor including a shaft adapted to rotate about an axis,
   a gas-path component that extends from the shaft for rotation therewith about the axis,
   a carrier that extends around the gas-path component to block gasses from passing over the gas-path component during rotation of the rotor, and
   an abradable runner that extends from the carrier toward the gas-path component to reduce a gap between the carrier and the gas-path component,
   wherein the abradable runner includes a first zone having a first microstructure and a second zone having a second microstructure different from the first microstructure, wherein the first zone and the second zone extend in an axial direction parallel to the axis such that the first zone is positioned circumferentially adjacent to the second zone with a circumferential side of the first zone contacting a circumferential side of the second zone.

2. The gas turbine engine assembly of claim 1, wherein the gas path component is selected from the group consisting of a turbine blade, a compressor blade, and a knife ring.

3. The gas turbine engine assembly of claim 1, wherein an elemental composition of the first zone is substantially the same as an elemental composition of the second zone.

4. The gas turbine engine assembly of claim 1, wherein the first microstructure comprises 1% to 50% porosity, and the second microstructure comprises 1% to 50% porosity.

5. The gas turbine engine assembly of claim 1, wherein the first zone is substantially sintered to the second zone to form a first layer of the abradable runner.

6. The gas turbine engine assembly of claim 5, wherein the first layer of the abradable runner is substantially sintered to a second layer of the abradable runner wherein the second layer includes a third zone substantially sintered to a fourth zone.

7. The gas turbine engine assembly of claim 1, wherein the abradable runner further comprises a third zone extending circumferentially around at least a portion of the central axis and a fourth zone extending circumferentially around the at least a portion of the axis such that the third zone is located axially adjacent to the fourth zone.

8. The gas turbine engine assembly of claim 1, wherein the first zone comprises a first grain size, and the second zone comprises a second grain size smaller than the first grain size.

9. The gas turbine engine assembly of claim 1, wherein the first microstructure comprises substantially solid particles within a matrix, and the second microstructure comprises hollow particles within a matrix.

10. The gas turbine engine assembly of claim 1, wherein the first zone and the second zone comprise a first phase and a second phase, wherein the first phase has a sintering temperature lower than a sintering temperature of the second phase, further wherein the first phase and the second phase of the first zone are at least partially sintered, the first phase of the second zone is at least partially sintered, and the second phase of the second zone is substantially unsintered.

11. The gas turbine engine assembly of claim 1, wherein the first zone and the second zone form a first layer of the abradable component and the abradable component includes a third zone and fourth zone that form a second layer arranged radially adjacent to the first layer.

12. A gas turbine engine assembly comprising:
a rotor including a shaft adapted to rotate about an axis,
a gas-path component that extends from the shaft for rotation therewith about the axis,
a carrier that extends around the gas-path component to block gasses from passing over the gas-path component during rotation of the rotor, and
an abradable runner that extends from the carrier toward the gas-path component to reduce a gap between the carrier and the gas-path component,
wherein the abradable runner includes a first zone having a first microstructure and a second zone having a second microstructure different from the first microstructure with the first zone arranged in a predetermined location relative to the second zone such that the first zone is positioned circumferentially adjacent to the second zone, and wherein the first microstructure is substantially sintered, and the second microstructure is at least partially unsintered.

13. A method comprising:
depositing a powder feedstock onto a gas turbine engine carrier, wherein the gas turbine engine carrier is part of a gas turbine engine comprising a rotor including a shaft adapted to rotate about an axis, a gas-path component that extends from the shaft for rotation therewith about the axis, and the carrier, wherein the carrier extends around the gas-path component to block gasses from passing over the gas-path component during rotation of the rotor;
heating a first zone of the powder feedstock to create a first microstructure using directed energy; and
heating a second zone of the powder feedstock to create a second microstructure using directed energy to form an abradable runner that extends from the carrier toward the gas-path component to reduce a gap between the carrier and the gas-path component, wherein the first zone is arranged in a predetermined location relative to the second zone such that the first zone is positioned circumferentially adjacent to the second zone, and wherein the first microstructure is substantially sintered and the second microstructure is at least partially unsintered.

14. The method of claim 13, wherein heating the first zone comprises heating to a first temperature, and the heating the second zone comprises heating to a second temperature lower than the first temperature such that a first phase and a second phase of the first zone are at least partially sintered, the first phase of the second zone is at least partially sintered, and the second phase of the second zone is substantially unsintered.

* * * * *